(12) United States Patent
Myers et al.

(10) Patent No.: US 7,524,180 B1
(45) Date of Patent: Apr. 28, 2009

(54) APPLYING A TEXTURE TO A PLIABLE SURFACE

(76) Inventors: Douglas W. Myers, 3829 E. Aldenbridge Cir., Highlands Ranch, CO (US) 80126; Richard Gary Fjelland, 752 Lakefair Pl. N., Keizer, OR (US) 97303

(*) Notice: Subject to any disclaimer, the term of this patent is extended or adjusted under 35 U.S.C. 154(b) by 196 days.

(21) Appl. No.: 11/395,469

(22) Filed: Mar. 30, 2006

Related U.S. Application Data

(60) Provisional application No. 60/667,344, filed on Mar. 31, 2005.

(51) Int. Cl.
*B29C 59/00* (2006.01)
(52) U.S. Cl. .......................... 425/385; 425/64
(58) Field of Classification Search ................ 425/186, 425/340, 385, 64; 101/3.1
See application file for complete search history.

(56) References Cited

U.S. PATENT DOCUMENTS

| | | | | |
|---|---|---|---|---|
| 3,969,056 A | * | 7/1976 | Larsen et al. ................ 425/218 |
| 4,186,166 A | * | 1/1980 | Hight, Jr. ..................... 264/139 |
| 4,379,683 A | * | 4/1983 | Rodgers et al. ............... 425/62 |
| 5,183,693 A | * | 2/1993 | Rhodes et al. ............. 428/34.1 |
| 5,202,132 A | | 4/1993 | Myers et al. |
| 2002/0064573 A1 | * | 5/2002 | Son ............................. 425/62 |
| 2006/0226566 A1 | * | 10/2006 | Kwak et al. ................ 264/40.1 |

* cited by examiner

*Primary Examiner*—Robert B Davis
*Assistant Examiner*—Maria Veronica D Ewald
(74) *Attorney, Agent, or Firm*—Merchant & Gould, P.C.

(57) ABSTRACT

In embodiments, the invention relates to an apparatus for applying a texture to pliable surfaces such as concrete panels used in construction of walls, sound barriers and other imprinted surfaces. The apparatus includes a main frame and a lift frame connected to the main frame with actuators. The actuators are operable to move the lift frame vertically. A flexible face is connected to the lift frame by a number of push devices. The push devices may be operated to apply force to a top surface of the flexible face. Attached to a bottom surface of the flexible face is a textured liner for applying a design to the pliable surfaces. The lift frame and the push devices operate to lay the flexible face flat on a pliable surface to imprint the design on the pliable surface. After imprinting the design, the flexible face is peeled away from the pliable surface.

17 Claims, 11 Drawing Sheets

APPLYING A TEXTURE TO A PLIABLE SURFACE

CROSS-REFERENCE TO RELATED PATENT APPLICATIONS

This patent application claims priority to U.S. Provisional Patent Application No. 60/667,344 filed Mar. 31, 2005, entitled METHOD AND APPARATUS FOR APPLYING TEXTURE TO A PLIABLE SURFACE. The entire contents of U.S. Provisional Patent Application No. 60/667,344 is hereby incorporated by reference in its entirety as if set forth herein in full.

FIELD OF THE INVENTION

The present invention generally relates to applying textures to pliable surfaces, such as concrete panels that may be used to build sound barriers and walls.

BACKGROUND OF THE INVENTION

Sound barriers and walls are commonly constructed using concrete panels. The concrete panels are manufactured in relatively large quantities at off-site locations, and transported to a site for constructing the sound barriers or walls. For aesthetic reasons, the concrete panels are typically colored, and in many cases are textured. The textures may include simple design patterns or elaborate designs, such as mosaics of landscapes (e.g., mountains, desert), animals or other artistic designs. In some cases, the textures also have functional purposes, such as to help aid in noise reduction.

Molds and stamps that include a negative of the desired texture are used to apply the textures to the panels. During the manufacture of the panels, concrete, or an alternative pliable material is poured into a mold that has a negative of the desired texture. When the concrete sets, it will include an imprint of the texture from the mold. A stamp is used to apply a texture to the top side of the panel, if desired. When the concrete (or other pliable material) has reached a specific viscosity, a stamp with the desired texture is placed in contact with the top side of the concrete panel, and force is applied to the stamp to imprint the texture onto the concrete panel.

U.S. Pat. No. 5,202,132 to Myers et al. ('132 patent) describes a method and device for stamping a texture on concrete panels. The '132 patent describes the use of a curved (convex) face that includes a texture for applying a design to a concrete panel. The curved face is moved in a rocking motion to apply the texture to the concrete panel. The rocking motion requires the design of a complicated hydraulic system to attempt to uniformly apply pressure to the curved face during the rocking motion. The device must have vertical stops readjusted for each height of concrete panel being manufactured, because of variations in panel height or screed height. If the stops are not adjusted properly, or the screed height is not correct, a pattern will not be fully imprinted, or the pattern will smear. If the rigid curved face has a positive or negative camber in the cross direction or if the concrete is not flat, the print will not be uniform. Additionally, the hydraulic system must be maintained and adjusted properly or the texture design applied to the panel will not be uniform, i.e., light in some areas and heavy in others. It is very difficult to trouble shoot hydraulic or mechanical problems with this complicated device. Moreover, because the prior art face is curved, vibration on the table or the stamp face will cause the pattern to slump in the non-contact areas resulting in reduced quality of the imprinted texture.

Accordingly, a need exists for applying a texture to a pliable surface, such as a surface of a concrete panel, which eliminates the problems encountered with the conventional approach to applying textures, and which improves the quality of the final imprinted design.

SUMMARY OF THE INVENTION

The following summary is provided to introduce a selection of concepts in a simplified form that are further described below in the Detail Description section. The summary is not intended to identify key features or essential features of the claimed subject matter, nor is it intended to be used as an aid in determining the scope of the claimed subject matter.

In some aspects, the present invention provides a flexible face with an uneven initial shape for applying a texture design to a pliable surface. The flexible face includes a top surface and a bottom surface that includes a texture design for imprinting on a pliable surface. The flexible face may be lowered to lay flat on the pliable surface to engage or contact the texture design with the pliable surface. As a result of its uneven shape, as it is lowered to lay flat on the pliable surface, it will tend to push air away preventing the air from being trapped between the bottom surface of the flexible face and the pliable surface. In embodiments, push devices are operable to apply force to the top surface of the flexible face when the face is being laid out flat on the pliable surface and/or after it has been laid out flat on the pliable surface. When the flexible face is raised from the pliable surface, it will tend to return to its uneven shape. Consequently, when raising the flexible face from the pliable surface, initially only a portion of the texture design is disengaged from the pliable surface, followed by the remaining portions of the texture design. This results in a peeling of the flexible face from the pliable surface, preventing damage to the texture design that has been applied to the pliable surface.

In one embodiment, the present invention relates to an apparatus for applying a texture to a pliable surface. The apparatus includes a mainframe and a lift frame that is connected to the mainframe and moves vertically in relation to the main frame. The apparatus also includes a flexible face with a top surface and a bottom surface, the bottom surface having a texture design. The flexible face has an uneven shape (e.g., curved or sloped), and is connected to the lift frame by a push device. The lift frame and the push device are operable to lay the flexible face flat on the pliable surface to apply the texture design to the pliable surface. In some embodiments, the push device may be implemented as a hydraulic cylinder, which is operable to apply force to the top surface of the flexible face. The force may be applied to facilitate laying the flexible face flat. In other embodiments, the push device may apply force to the top surface of the flexible face after it is laid flat, to press the texture design into the pliable surface and aid imprinting the texture design on the pliable surface.

In other embodiments, the apparatus may additionally include a liner with the texture design. The liner may be fixedly or removably attached to the bottom surface of the flexible face. In these embodiments, the liner engages, or contacts, the pliable surface to imprint the texture design on the pliable surface.

In another embodiment, the present invention relates to a method of applying a texture design to a pliable surface using a flexible face with the texture design on a bottom surface of the flexible face. The method includes the step of lowering a flexible face with an uneven shape to lay the flexible face flat on the pliable surface and engage the texture design with the pliable surface to imprint the texture design on the pliable surface. Optional steps may be performed to vibrate the flexible face, and apply force to the flexible face during the lowering, or after the flexible face has been laid flat on the pliable surface. Finally, the method includes raising the flexible face from the pliable surface, wherein after the raising the flexible face returns to its initial uneven shape.

DETAILED DESCRIPTION

Embodiments of the present invention provide an apparatus for applying texture to a pliable surface. In the following description, embodiments of the present invention are described in relation to applying texture to concrete panels, which may be used in constructing different structures, such as decorative walls and sound barriers. However, the present invention is not limited thereto. In other embodiments, the present invention may be used to apply textures to other pliable surfaces, including but not limited to: poured slabs of concrete, such as driveways, walkways and sidewalks; liquid Styrofoam; castable polymers; wet wood pulp products; asphalt products for roads or roofing; and composite products such as concrete/fiber siding.

Figure 1:
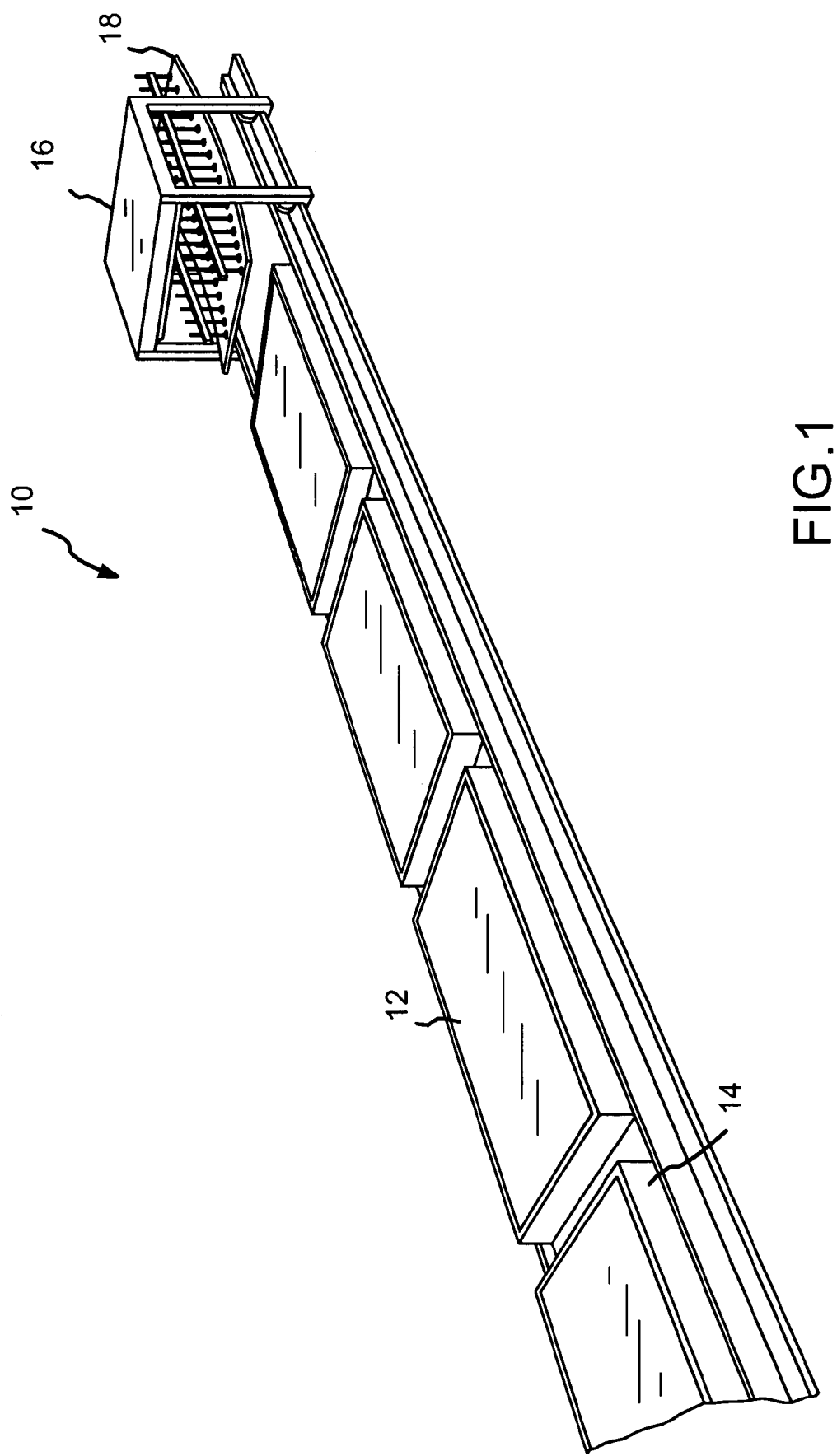
FIG. 1 is a perspective view of a system for applying texture to pliable panels such as concrete panels.

FIG. 1 generally shows a production system 10 for manufacturing a number of concrete panels 12. The system 10 includes a number of production/casting tables 14 with molds, into which concrete has been poured to form concrete panels 12. The system 10 also includes apparatus 16, which is used to apply a texture to the top surface of concrete panels 12, according to an embodiment of the present invention. In the embodiment shown in FIG. 1, apparatus 16 is movable, while tables 14 are stationary. Apparatus 16 includes a flexible face (described in greater detail below) 18, and is movable on tracks 20 to position the flexible face 18 above concrete panels 12 to apply a texture to the top surface of the panels 12.

Figure 2:
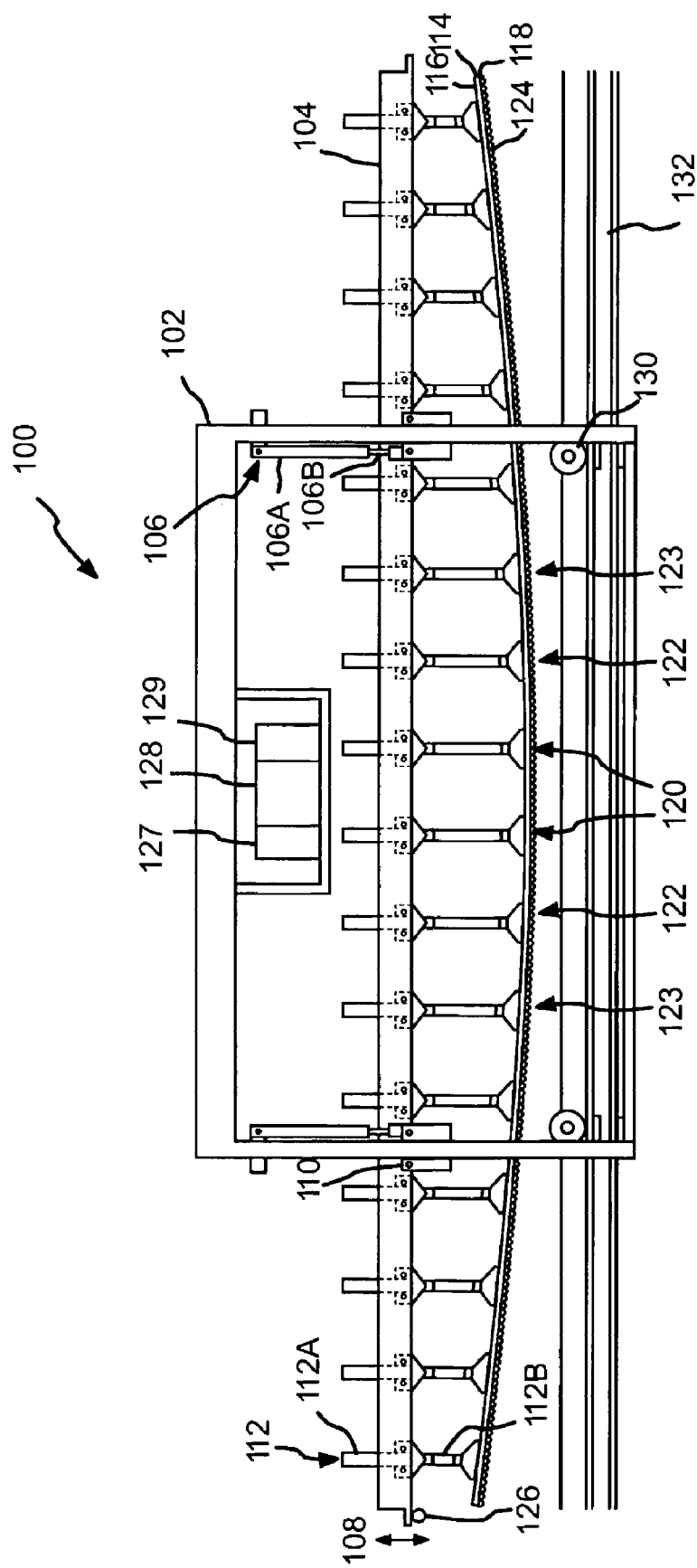
FIG. 2 is a side view of one embodiment of an apparatus for applying texture to pliable panels, showing a flexible face and a liner with a curved profile.

FIG. 2 is a side view of a stamping assembly 100, for applying a texture to concrete panels, according to an embodiment of the present invention. Stamping assembly 100 is one implementation of apparatus 16 (FIG. 1) mentioned above with respect to system 10. Stamping assembly 100 includes a mainframe 102 and a lift frame 104, which is movably connected to the mainframe 102 using actuators 106. Actuators 106 are operable to move lift frame 104 vertically as illustrated by arrows 108. In the embodiment shown in FIG. 2, the actuators 106 include hydraulic cylinders 106A and piston rods 106B, although one skilled in the art may substitute alternative actuators for the cylinders and rods, including but not limited to hydraulic cylinders, pneumatic cylinders, screw actuators, rotary actuators or a combination thereof. Stamping assembly 100 also includes guide rollers 110 that aid in moving lift frame 104 vertically.

A number of push down devices 112 connect the lift frame 104 to a flexible face 114. The flexible face 114 includes a top surface 116 and a bottom surface 118. In one embodiment, the push down devices 112 include hydraulic cylinders 112A connected to the lift frame 104 and piston rods 112B which are connected to the flexible face 114. The piston rods 112B are pivotally connected to the top surface 116 of flexible face 114. Connections for connecting piston rods 112B to flexible face 114 are described in greater detail below with respect to FIGS. 5 and 7. It should be noted that although the push devices 112 are shown and described as including hydraulic cylinders 112A and piston rods 112B, the invention is not limited thereto. In other embodiments, push devices 112 may be implemented using hydraulic cylinders, pneumatic cylinders, spring based shock absorbers or a combination thereof. The description of push devices 112 as including hydraulic cylinder 112A and piston rods 112B is for illustration purposes only, and is not intended to be limiting.

In an embodiment, shown in FIG. 2, the flexible face 114 has a shape with an uneven shape. By "uneven," it is meant not level, or not substantially parallel, with respect to a pliable surface positioned underneath flexible face 114. In FIG. 2, flexible face 114 has a curved profile. The curved profile is achieved by providing push devices 112 with piston rods 112B that have different travel lengths to fit the curve profile. As shown in FIG. 2, the piston rods 112B of push devices 120 may be extended the farthest. Push devices 122 (on either side of push devices 120) have the next longest extension length of the piston rods 112B, followed by push devices 123 (on either side of push devices 120). This pattern continues with the remaining push devices 112. The weight of flexible face 114 extends piston rods 112B, and because of their different travel lengths the extension of piston rods 112B results in the curved shape of flexible face 114.

In other embodiments, the curved shape of flexible face 114 is achieved by the push down devices 112 being operated to apply force to the top surface 116 of flexible face 114 to alter the shape of flexible face 114.

The flexible face 114 is made of a material(s) with properties that allow it to flex in response to the different travel lengths of piston rods 112B and/or the application of force by push devices 112. One example of a suitable material is mild steel. Other materials that may be used in constructing flexible face 114 are discussed in greater detail below.

Attached to face 114 is a liner 124 that includes a design for applying texture to a top surface of concrete panels. As previously described, the texture may be a simple pattern, or a complicated design such as an elaborate mosaic. Liner 124 is attached, either fixedly or removably, to the bottom surface 118 of face 114. Some examples of connections for attaching liner 124 to flexible face 114 are described below with respect to FIGS. 5-7.

Additionally, stamping assembly 100 preferably includes a sprayer 126 and a spray pump unit 127, a hydraulic power unit 128, and an optional electric generator 129. The sprayer 126 and pump 127 are used to spray a compound (e.g., a curing compound or bond breaker) on a concrete panel prior to applying a texture to the concrete panel. The power unit 128 and generator 129, supply any necessary power to stamping assembly 100, such as to power a control panel for controlling operation of stamping assembly 100.

In one embodiment, stamping assembly 100 also has drive wheels 130 and guide rollers (not shown) that allow stamping assembly 100 to be moved, i.e., rolled, on tracks or tables 132 for positioning the face 114 and liner 124 above different concrete panels. In alternative embodiments, stamping assembly 100 may be stationary, with the concrete panels being moved under the face 114 to position them for application of texture. One example of such an embodiment is discussed below, with respect to FIG. 10.

A general description of the operation of stamping assembly 100 follows. Once the surface of a concrete panel has been leveled and colored, if desired, assembly 100 may be used to apply a texture to the top surface of the panel. Drive wheels 130 are used to move assembly 100 over a concrete panel to position flexible face 114 over a top surface of the panel. As assembly 100 is moved over the panel, a curing compound and/or bond breaker is sprayed on the surface of the panel with sprayer 126 and spray pump 127. Once the spraying operation is complete, the flexible face 114 is positioned over the panel. When in proper position, the lift frame 104 is lowered, by actuating actuators 106 and aided by guide rollers 110. The lift frame 104 continues to lower until the weight of the assembly 100 comes to bear on the concrete panel for example, at the center of the curved face 114 (as shown in FIG. 2).

In one embodiment shown in FIG. 2, push devices 120 are actuated and carry the full weight of assembly 100 when lift frame 104 is lowered to engage, or contact, liner 124 with the concrete panel. While the flexible face 114 is under load, the center push devices 120 are depressurized and the lift frame 104 travels down. The weight of assembly 100 comes to bear on the next set of push devices 122 (located on either side of push devices 120), which are pressurized after depressurizing push devices 120. After the load of assembly 100 has been placed on push devices 122 for a suitable amount of time, push devices 122 are depressurized and the lift frame 104 travels down again so that the weight of assembly 100 comes to bear on the next set of push devices 123 (located on either side of push devices 122), which are pressurized. In one embodiment, this sequence continues with the remaining push devices 112, until the flexible face 114 and liner 124 are laid out flat on the concrete panel. Optionally, vibration can be applied during this lowering process or after the liner is flat. One embodiment of the present invention that includes a vibrating device is described below with respect to FIG. 4.

An alternate sequence for contacting the liner 124 with the concrete panel is to lower the lift frame 104 without actuating any of push devices 112, and let the push devices 112 freely compress and progressively lay the liner 124 flat. After the liner 124 is lying flat on the concrete panel, the push devices 112 may then be selectively pressurized to set the texture by applying force to the top surface 116 of flexible face 114 and pressing liner 124 into the concrete panel.

After the application of the texture is complete, the flexible face 114 and liner 124 are removed from contacting the concrete panel. In one embodiment, the lift frame 104 is raised without pressurizing any of the push devices 112. The push devices 112 freely extend and progressively reach the end of their strokes. This peels the flexible face 114 and the liner 124 off of the ends first, which prevents suction and damage to the pattern. In another embodiment, in conjunction with raising the lift frame 104, push devices 112 located at an end of flexible face 114, such as push devices 140 illustrated and described in FIG. 3, may be pressurized to peel the flexible face 114 and the liner 124 from an opposite end first, followed by the remaining portion of the liner 124 as the lift frame 104 raises. After removing the flexible face 114 and liner 124 from the surface of the concrete panel, stamping assembly 100 can then be moved to repeat the cycle and apply a texture to another concrete panel.

As will be appreciated by those of ordinary skill in the art, the process of laying the curved flexible face 114 and liner 124 flat, tends to push away air located between the liner 124 and the concrete panel, thereby preventing the air from being trapped between the liner 124 and the concrete panel. This improves the imprint of the texture applied to the concrete panel, compared to stamps that have a rigid (fixed shape), which are more likely to trap air.

A feature of assembly 100, and embodiments of the present invention, is the ability to actuate push devices 112 to selectively control the location and duration of force that is applied to the top surface 116 of face 114 to ensure that the texture is evenly applied to the concrete panel. If additional force or time is required to apply the texture in some locations to the concrete panel, the weight of assembly 100 may be kept on selected ones of push devices 112 for longer periods of time, when the liner 124 is being flattened onto a concrete panel, as described above. For example, if the texture design on liner 124 has intricate features in the middle, the weight of assembly 100 may be kept on middle push devices 120 for a longer period of time than on other ones of push devices 112. As another example, after the liner 124 has been laid down flat, selected ones of push devices 112 may be pressurized to apply additional force to select locations on the top surface of the flexible face 114, to further press the liner 124 into the concrete panel.

Figure 3:
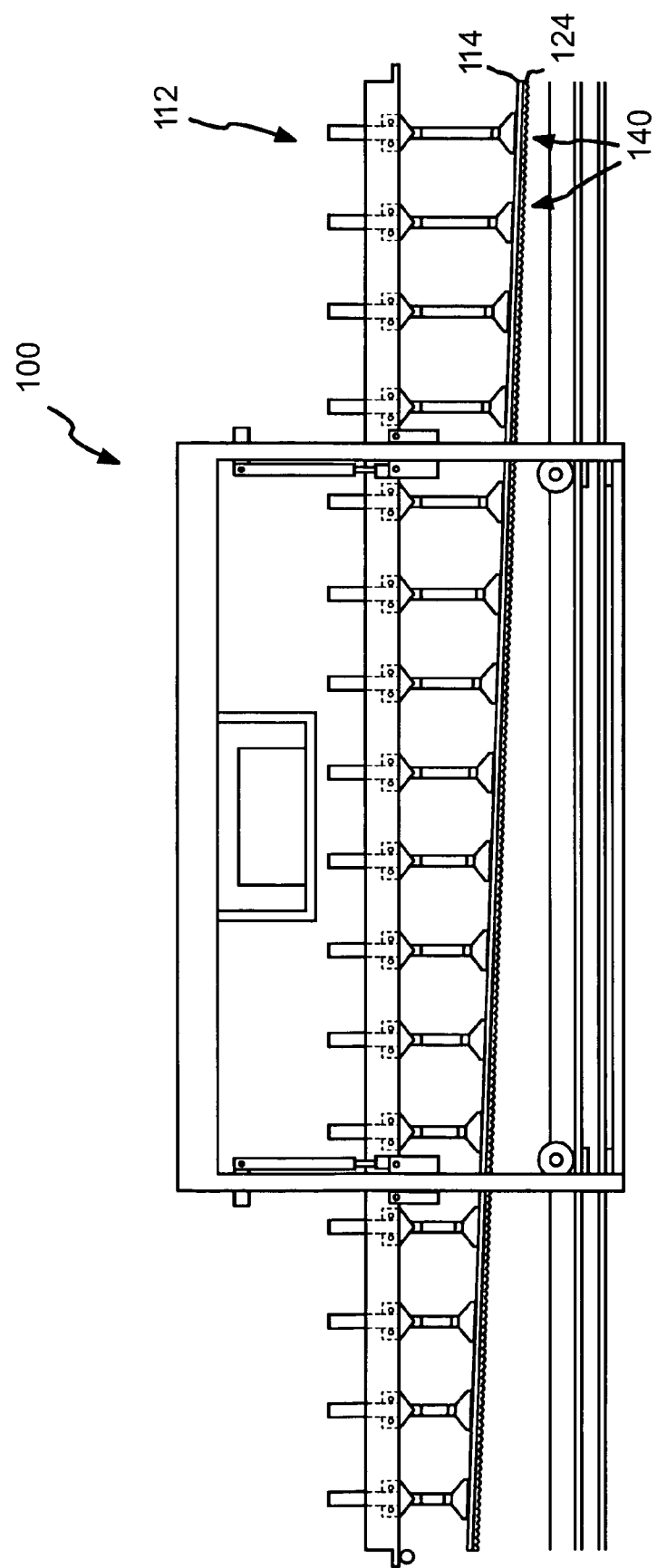
FIG. 3 is a side view of the apparatus shown in FIG. 2 wherein the flexible face and liner having a sloped profile.

Referring now to FIG. 3, stamping assembly 100 is shown with flexible face 114 having a different uneven shape than shown in FIG. 2. FIG. 3 illustrates another feature of the present invention, namely the ability to change the shape and profile, of the flexible face 114 to any desired uneven shape. As previously stated, the term "uneven" is intended to mean not level or not substantially parallel relative to a pliable surface positioned underneath flexible face 114. The curved flexible face shown in FIG. 2 and the sloped flexible face shown in FIG. 3 are non-limiting examples of uneven shapes that a flexible face may have.

In those embodiments, where the push devices 112 are implemented using single acting hydraulic cylinders 112A, the extension lengths of piston rods 112B can be adjusted to give flexible face 114 any desired shape. In those embodiments, where hydraulic cylinders 112A are implemented as double acting cylinders 112A, they can be controlled to selectively apply force to the top surface 116 of flexible face 114 to control the shape/profile of flexible face 114 and consequently liner 124. The ability to control the shape/profile of face 114 provides control over which portion of liner 124 first contacts a concrete panel.

Accordingly, in the embodiment shown in FIG. 3, push devices 140 on one end (the right end) have piston rods 112B with longer travel lengths than the other piston rods 112B. The extension length of piston rods 112B is progressively shortened for the remaining devices 112, from right to left. This results in flexible face 114 being oriented at a sloping angle with respect to a concrete panel that is positioned underneath liner 124. When pressed against a concrete panel, the right side of liner 124 will contact the concrete panel first. When lift frame 104 is lowered, the liner 124 will gradually contact the concrete panel. This shape of flexible face 114 and liner 124 also helps to prevent air from being trapped between liner 124 and a concrete panel. Specifically, as the liner 124 gradually contacts the concrete panel, air will be pushed from right to left, preventing the air from being trapped between the concrete panel and the liner 124.

As illustrated in FIGS. 2 and 3, the present invention provides a number of advantages over conventional stamps for applying textures to concrete panels. One significant advantage is the ability to selectively program, i.e. alter, the shape and profile of the flexible face 114 and liner 124, using push devices 112 with different travel lengths for the piston rods 112B. This allows control over what portion of a texture design on liner 124 is applied to a concrete panel first. In some instances, a texture design may include some portions with unique architectural or graphic features that have fine details. In these cases, it is desirable that those portions contact the concrete panel first. With the present invention, the flexible face 114 may be shaped such that the unique architectural feature or graphic feature contacts the concrete panel first and effects the displacement of the concrete at this critical location. In this process, air is again pushed away from the architectural or graphic feature rather than being trapped by the feature.

Thus, in the embodiments in FIGS. 2 and 3, the present invention provides a flexible face 114 that has an uneven initial shape. The flexible face 114 includes a liner 124 on a bottom surface 118 of the flexible face 114 that includes a texture design for imprinting on a pliable surface. The flexible face 114 may be lowered to lay flat on the pliable surface to engage or contact the entire texture design of the liner 124 with the pliable surface. As a result of its uneven shape, as the face 114 and liner 124 is lowered to lay flat on the pliable surface, it will tend to push air away preventing the air from being trapped between the liner and the pliable surface. The push devices 112 are operable to apply force to the top surface 116 of the flexible face when the face is being laid out flat on the pliable surface and/or after it has been laid out flat on the pliable surface. When the flexible face 114 is raised from the pliable surface, it will tend to return to its initial shape. Consequently, when the flexible face 114 is raised, only a portion of the liner 124 is disengaged from the pliable surface first, followed by the remaining portions of the liner 124. This peels the liner from the pliable surface preventing damage to the texture design that has been applied to the pliable surface.

It should be noted that the shapes of flexible face 114 disclosed in FIGS. 2 and 3 above are not intended to be limiting. The flexible face 114 may be shaped into any suitable uneven shape, including but not limited to, curved and sloped. The number of shapes that flexible face 114 may be shaped into will depend on a variety of factors, including, but not limited to, the positions/locations of push devices 112, the travel length for pistons 112B, the amount of force that push devices 112 may exert (in some embodiments), the material of flexible face 114, and the dimensions of flexible face 114.

The flexible face 114 may be made of any suitable material that flexes or changes shape, and that withstands the conditions involved in applying textures to concrete panels. For example, the flexible face 114 must be strong enough to handle the application of large amounts of force to the top surface 116, without breaking or cracking, yet it must be ductile enough to be flexed into a variety of shapes and profiles. Additionally, flexible face 114 must be made from materials that tolerate the corrosive effects of water and other substances common in concrete formation, such as lime from cement. Some non-limiting examples of materials for use in making flexible face 114 include mild steel, wood, aluminum, fiberglass, composite materials and combinations thereof. In one specific embodiment of the present invention, flexible face 114 is made from a mild steel plate approximately ⅜" thick, and includes narrow pieces of mild steel welded to top surface 116 to give face 114 some additional stiffness.

Similar to the flexible face 114, the liner 124 must also be made of flexible materials that allow the liner to flex with face 114, but that are robust enough to handle the conditions involved in applying textures to concrete panels. Additionally, liner 124 also includes a negative of the texture design that is applied to the top surface of the concrete panels, and thus must be made from materials that can be molded to form the texture designs. Moreover, the liner 124 must leave a sharp imprint of the texture design each time it is used to stamp a concrete panel. Examples of materials that may be used to make liner 124 include, but are not limited to, polymeric materials (e.g. polyurethanes & rubbers), mild steel, wood, aluminum, fiberglass, composites materials and combinations thereof.

In one specific embodiment, liner 124 is a composite made from a polymeric material (e.g., polyurethane resin) which includes the texture design, and a plywood backing that provides the polymeric material some rigidity and aids in attaching the liner 124 to the flexible face 114. The plywood and the polymeric material may be joined in a number of ways. As one example, the plywood may be glued to the polymeric material. As another example, the polymeric material may be cast around the plywood. In one specific embodiment, a piece of plywood includes a number of holes. A polymeric resin is then poured around the plywood and polymerized with a catalyst to form the hardened polymeric material within the holes of the plywood and around the edges of the plywood, creating a mechanical connection between the plywood and polymeric material. Alternatively, a composite liner may substitute a steel frame for the plywood backing so that a polymeric liner material (polyurethane) is bonded to the steel frame.

The size of flexible face 114 and liner 124 will vary depending on the size of the panels being textured. In one specific embodiment, the liner and flexible face are approximately 12 feet wide by approximately 36 feet long. In another embodiment for texturing smaller panels, the liner and the flexible face are 12 feet wide by 12 feet long. As those with skill in the art will understand, the flexible face 114 and liner 124 may be scaled to any size to accommodate different sizes of concrete panels and/or texture designs.

Figure 4:
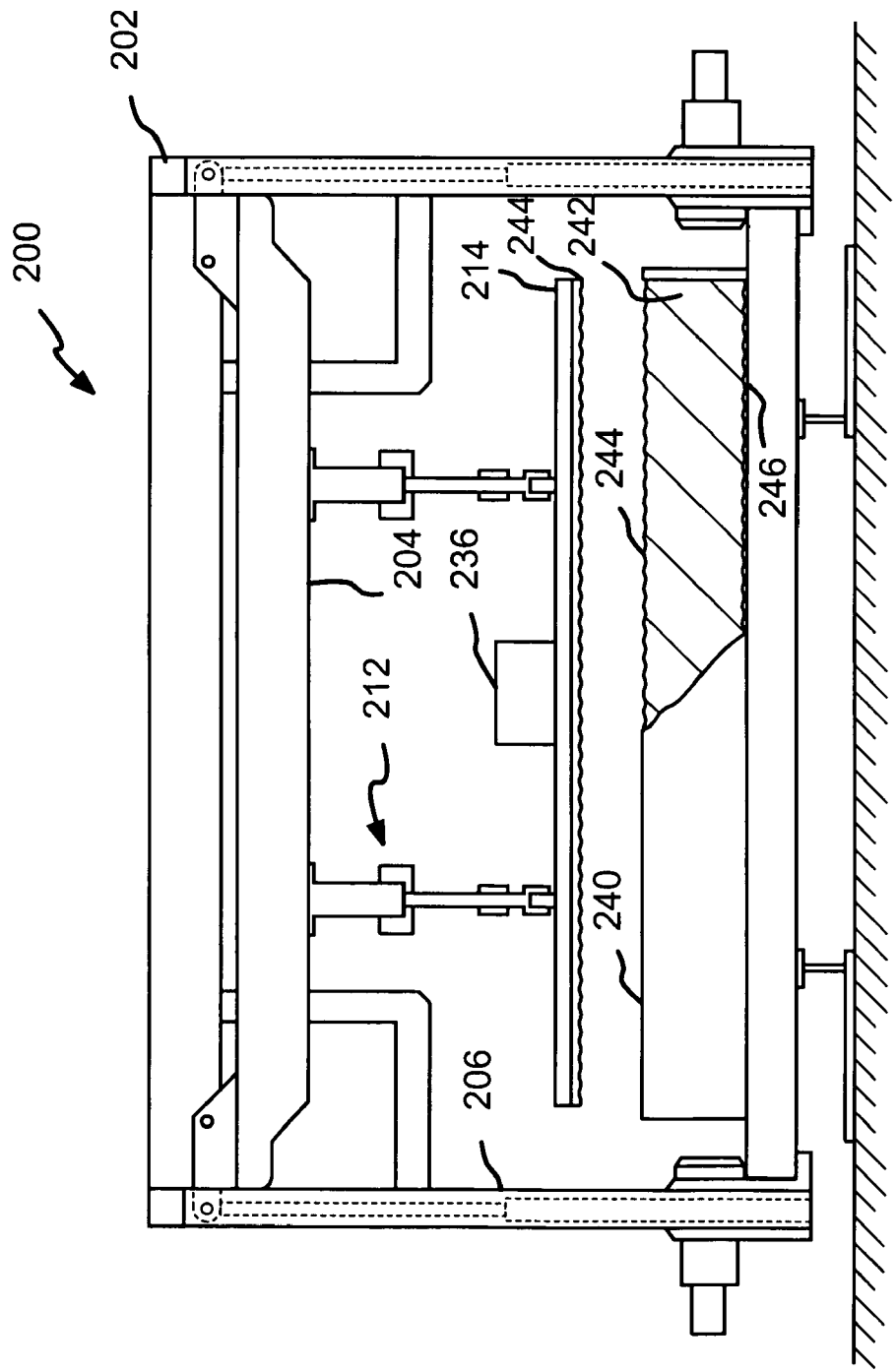
FIG. 4 is an end view of an alternative embodiment of the apparatus shown in FIGS. 2 and 3, illustrating a mold containing the pliable material positioned below the flexible face and liner.

FIG. 4 shows an end view of stamping assembly 200 that may be used to apply texture to a concrete panel, according to an alternative embodiment of the present invention. Assembly 200 has similar parts as assembly 100, but is configured differently. Assembly 200 includes a main frame 202, lift frame 204, actuators 206, push devices 212, flexible face 214, and liner 224. Stamping assembly 200 operates similar to assembly 100 to apply a texture to a concrete panel, i.e., lift frame 204 is lowered; and flexible face 214 is laid flat on a concrete panel, by actuating push devices 212, etc.

Shown in FIG. 4 is a production/casting table 240 with a mold for creating a concrete panel 242. FIG. 4 shows a cutout of table 240 to better illustrate panel 242. Concrete has been poured into the mold of table 240 to create concrete panel 242. Concrete panel 242 has a texture on a bottom side 246 that is created by the mold, which includes a negative of the texture. In addition, the top side 244 has been stamped with liner 224 to imprint a texture. Panel 242 illustrates what a typical concrete panel looks like after a texture has been applied by the stamping assembly 200.

As can be seen in FIG. 4, assembly 200 has two rows of push devices 212. The addition of more than one row of push devices 212 provides enhanced control over the force that may be applied to flexible face 214 and to liner 224 when pressed against concrete panel 242. Moreover, the additional push devices 212 also allows the flexible face to be shaped into a greater variety, and more complicated, shapes and profiles. It should be noted that the location and number of rows of push devices (112 and 212) shown in FIGS. 2, 3 and 4 are illustrative, and the present invention is not limited thereto. In other embodiments, an apparatus may include one, two, or more than two rows of push devices. In yet other embodiments, the push devices may not be positioned in rows, but may be positioned in other patterns.

One additional feature included with the assembly 200 is vibration device 236. Vibration device 236 vibrates and shakes flexible face 214 and liner 224. Vibration device 236 is used to improve the quality of the texture imprint made by liner 224 on a concrete panel. Once flexible face 214 and liner 224 have been laid out flat on the surface of concrete panel 242, vibration device 236 is operable to vibrate flexible face 214. The vibration of liner 224 ensures that the concrete fills in the crevices and details in liner 224, to leave a high quality imprint of the texture on concrete panel 242. In particular, high-frequency vibrations tend to liquefy the highly-viscous concrete material, thereby allowing the material to better "fill-in" around the features of the liner 224. In some embodiments, vibration device 236 may be used to vibrate flexible face 214 and liner 224 as they are being laid flat on concrete panel 242. The use of vibration device 236 allows less hand vibration during the initial pour to set the bottom liner pattern. The flex face may also allow use of vibration attached to some tables.

Figure 5:
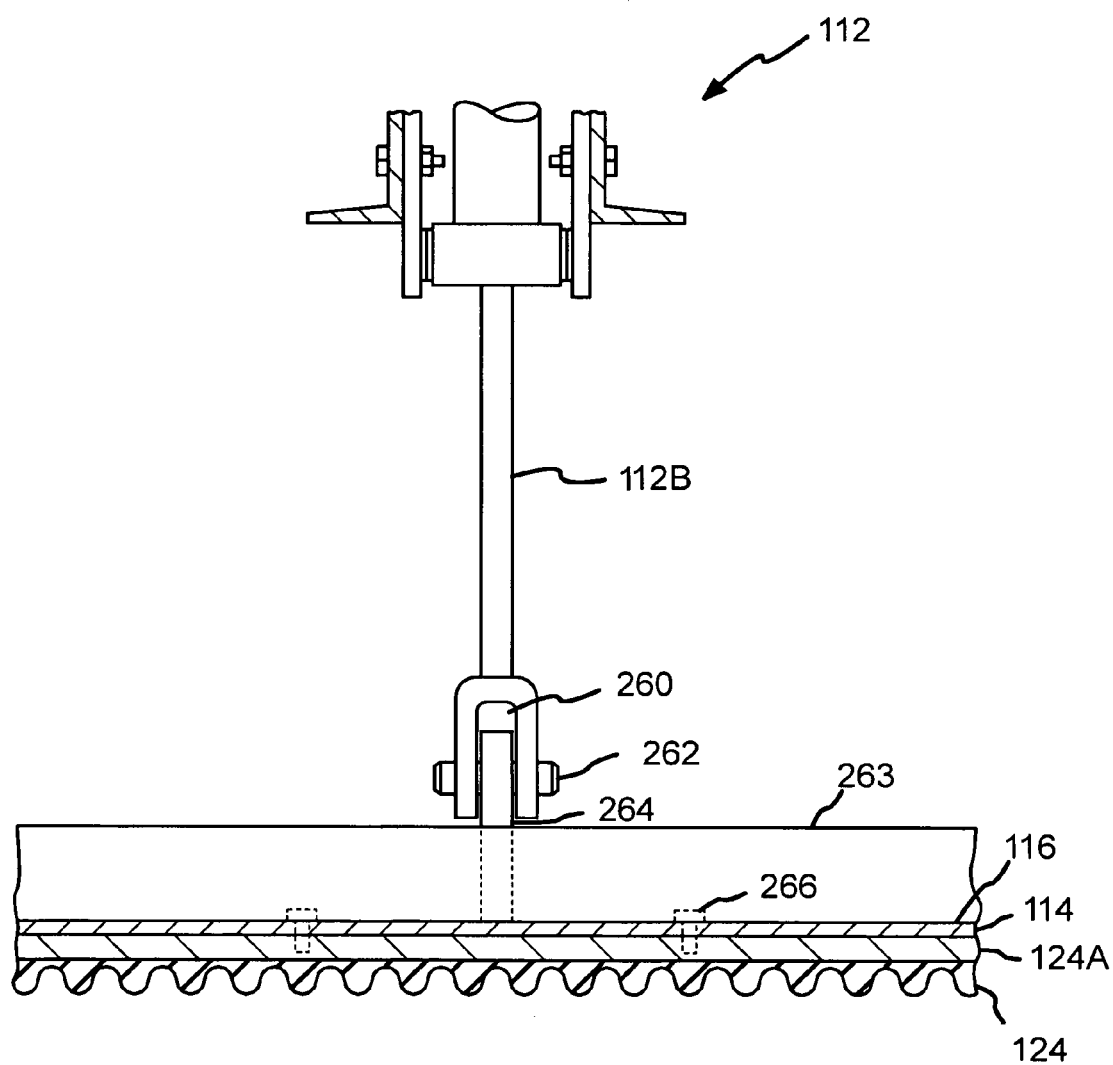
FIG. 5 illustrates a first embodiment of a connection between a flexible face and a lift frame.

FIG. 5 illustrates one type of connection that may be used to hingedly connect push devices (such as push devices 112 or 212) to a flexible face (such as flexible face 114 and 214). Also shown in FIG. 5 is a type of connection for connecting a flexible face to a liner. For illustrative purposes, FIG. 5 will be described using the part numbers from FIGS. 2 and 3.

As shown in FIG. 5, piston rod 112B of push device 112 includes a female connector 260 with a hole (not shown) that extends through connector 260 to accommodate a pin 262. Female connector 260 engages with male connector 264, which is located on top surface 116 of flexible face 114. In some embodiments, a cross stiffener 263 is attached to the top surface 116 of flexible face 114. In these embodiments, male connector 264 may be connected to the stiffener 263 in lieu of, or in addition to, the top surface 116 of flexible face 114. Male connector 264 also includes a hole (not shown) to accommodate pin 262. Accordingly, the connection between push device 112 and flexible face 114 is made by engaging female connector 260 with male connector 264 and sliding pin 262 through the holes in the connectors 260 and 264. In addition to connecting push device 112 to flexible face 114, pin 262 acts as a hinge pin to allow movement of flexible face 114 with respect to push device 112, which helps to accommodate the flexing of face 114 to change its shape and profile. In some embodiments, pin 262 will include an additional feature, e.g. a handle, ring, etc., to aid a user in sliding pin 262 out of the holes in connectors 260 and 264. This is useful when first flexible face 114 is being changed to another flexible face that has a liner with a different texture design.

Also shown in FIG. 5 are fasteners 266, which fixedly attach liner 124 to flexible face 114. Some non-limiting examples of the fasteners 266 include screws, bolts, nuts, rivets and combinations thereof. In one specific embodiment, the liner 124 includes a laminated plywood backing 124A. In this embodiment, fasteners 266 are lag screws that extend through a portion of flexible face 114 and into the plywood portion 124A of liner 124. Of course, the above description of fasteners 266 is merely illustrative, and any type of suitable fastener may be used as fasteners 266.

As will be appreciated by those with skill in the art, there are a number of ways in addition to the use of fasteners 266 to fixedly attach liner 124 to flexible face 114. For example, liner 124 may be glued to face 114. As another example, if the liner 124 is made of a polymeric material, the polymeric material may be cast around the flexible face 114. A number of holes may be made in flexible face 114. A polymeric resin, which is a precursor to the polymeric material of the liner 124 is then poured around the flexible face and polymerized (e.g., with a catalyst) to form the hardened polymeric material within the holes in the flexible face 114 and around the edges of face 114, creating a mechanical connection or bond.

Figure 6:
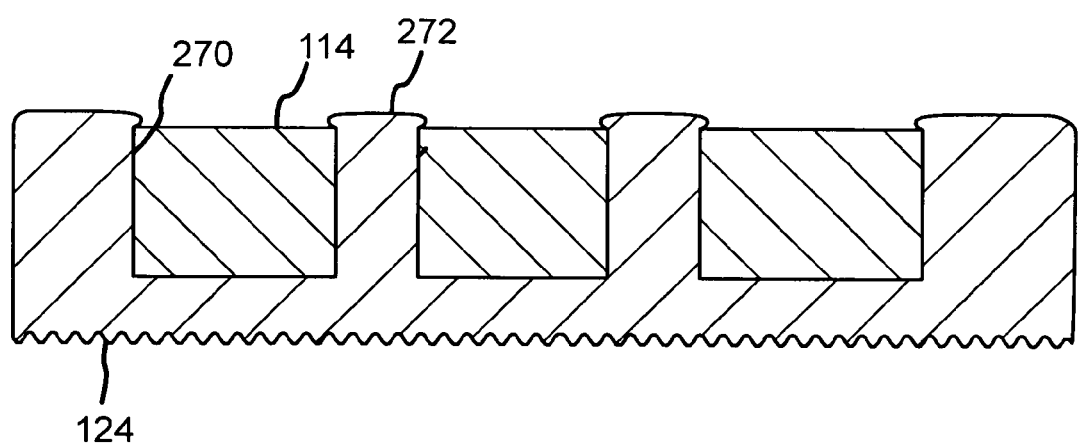
FIG. 6 illustrates a cross-section of a liner and a flexible face showing that the liner has been attached to flexible face by being formed around the flexible face.

FIG. 6 shows a cross section of an exemplary flexible face 114 and liner 124 that have been formed as described above. The cross-section shows an edge 270 of flexible face 114, and a hole 272 that extends through flexible face 114. As shown in FIG. 6, a polymeric material used to make liner 124 has been formed within hole 272, and around edge 270, creating a mechanical bond between liner 124 and flexible face 114.

Figure 7:
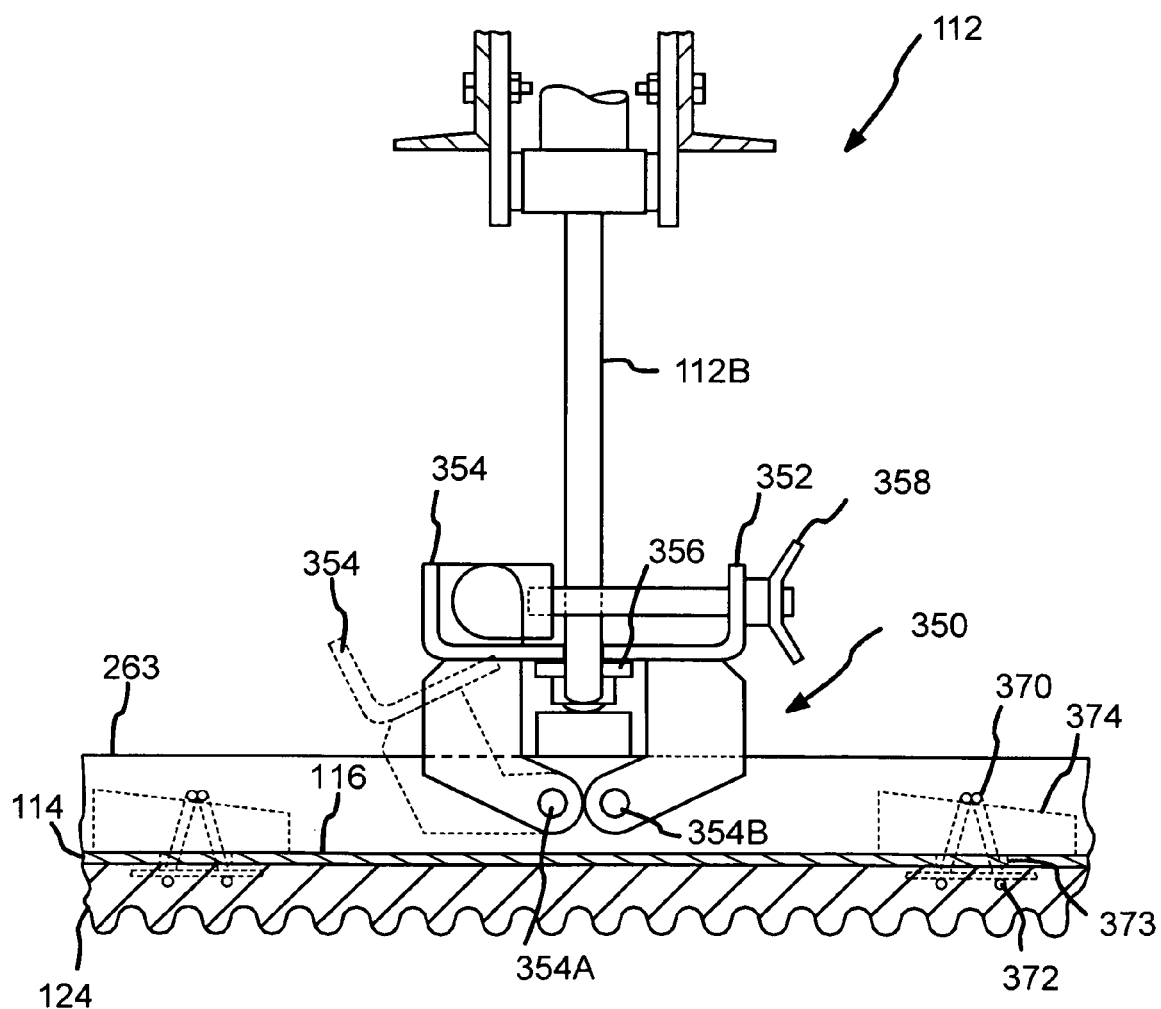
FIG. 7 illustrates a second embodiment of a quick connection between the flexible face and the lift frame.

FIG. 7 illustrates a second type of connection that may be used to removably and hingedly connect push devices (such as push devices 112 or 212) to a flexible face (such as flexible face 114 and 214). Also shown is a second type of connection for removably connecting a liner to a flexible face. For purposes of simplicity, FIG. 7 will be described using the part numbers from FIG. 2.

FIG. 7 shows a clamp 350 for securing piston rod 112B to flexible face 114. Attached to flexible face 114 is cross stiffener 263. Clamp 350 includes angles 352 and 354 which are attached to cross stiffener 263 at points 352A and 354A (with pins or other types of fasteners), respectively.

In the embodiment shown in FIG. 7, angle 354 pivots about point 354A to open clamp 350 for receiving piston rod 112B. FIG. 7 shows in dashed lines the position of angle 354 when clamp 350 is opened to receive piston rod 112B. In other embodiments, angle 352 pivots about point 352A and has a corresponding open position. Additionally, in some embodiments clamp 350 also include one or more springs, not shown, to maintain angle 354 in a closed position in the absence of a force pivoting angle 354.

Piston rod 112B includes a lip 356. When clamp 350 is closed, at least a portion of angles 352 and 354 are positioned above lip 356 to secure piston rod 112B within clamp 350. In some embodiments, a bolt 358 may be used to additionally secure piston rod 112B within clamp 350. In other embodiments, bolt 358 may be eliminated completely, if clamp 350 adequately secures piston rod 112B.

In some embodiments, clamp 350 may be opened automatically. For example, in one embodiment, clamp 350 may be configured to be opened by piston rod 112B being pushed down with enough force to pivot angle 354. In other embodiments, the pivoting of angle 354 may be accomplished by an actuator, such as a hydraulic cylinder.

Also illustrated in FIG. 7, is a connection for removably attaching liner 124 to flexible face 114. Shown in FIG. 7 are hoops 370 that are connected to, and extend vertically up from, liner 124. In one embodiment, hoops 370 are attached to a wire mesh 372 that is embedded within liner 124. The wire mesh 372 may be embedded at the time that liner 124 is formed. For example, in one embodiment, the liner may be formed from a polymeric material. A polymeric resin (which is a precursor to the polymeric material) may be poured around the wire mesh 372, which includes the hoops 370 extending vertically upward. The polymeric resin may then be polymerized with a catalyst to form the solid polymeric material, which includes the embedded wire mesh 372 and the hoops 370 extending up vertically.

To attach liner 124 to flexible face 114, the hoops 370 are positioned within holes 373, in flexible face 114. The hoops 370 extend through holes 373 so that at least a position of the hoop is positioned above top surface 116. Wedge members 374, located above the top surface 116 of the flexible face 114 are then slid into hoops 370 to secure liner 124 to flexible face 114. To detach liner 124 from flexible face 114, wedge members 374 are merely slid out of hoops 370, allowing the liner 124 to be detached from flexible face 114.

In some embodiments, a number of wedges 374 are all connected, so that they may be simultaneously slid into and out of a corresponding number of hoops 370. This allows for automation in attaching and detaching liner 124 to/from flexible face 114. For example, in one embodiment, a number of wedges 374 are connected together (e.g., with a bar) and are actuated to slid into and out of a corresponding number of hoops 374 with an actuator (e.g., hydraulic cylinder). Those with ordinary skill in the art will appreciate a number of ways to connect wedges 374 to simultaneously slide a number of wedges 374 into and out of a corresponding number of hoops 370.

Figure 8:
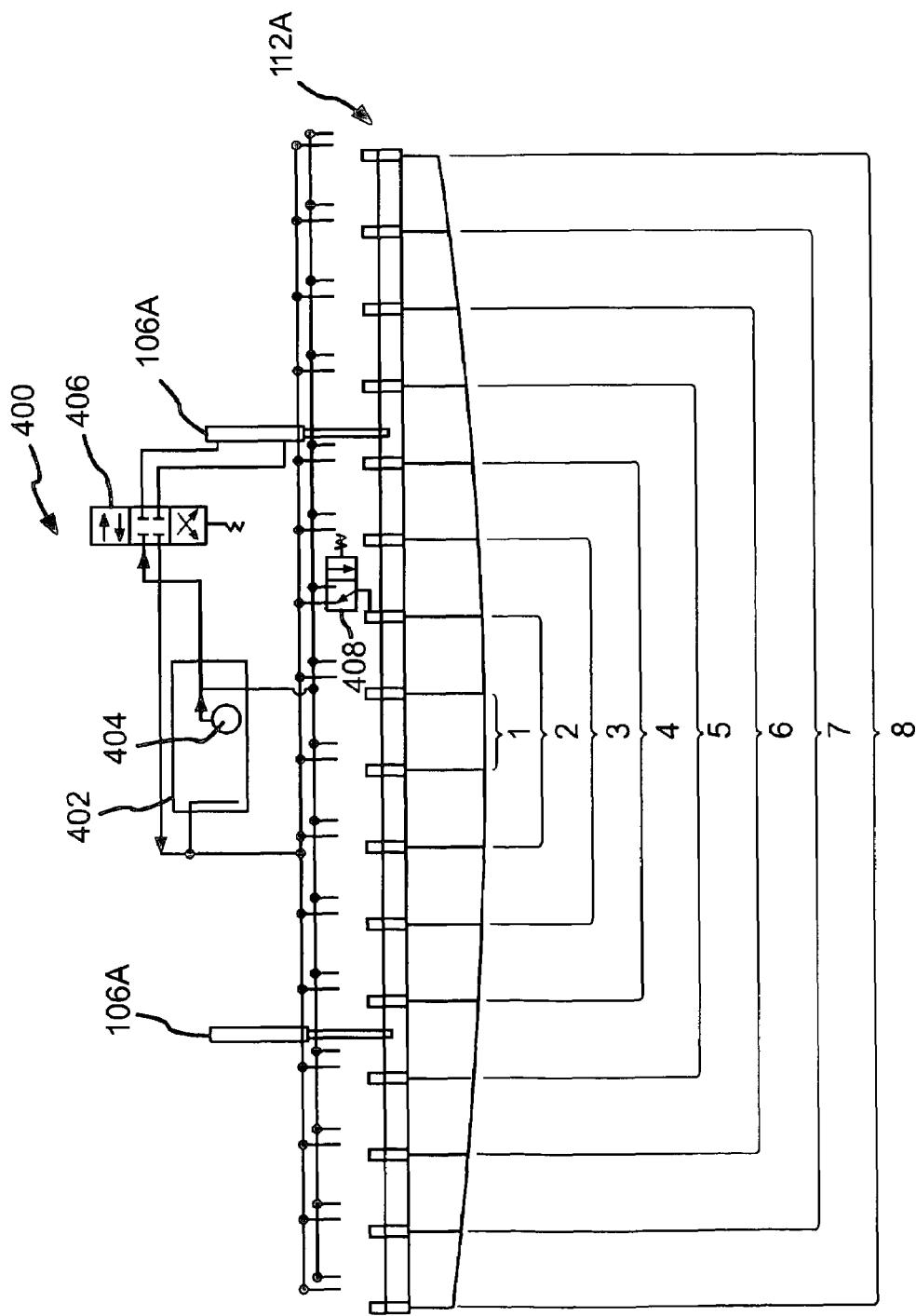
FIG. 8 illustrates a schematic of a hydraulic circuit that may be used with the apparatus of FIGS. 2 and 3.

Shown in FIG. 8 is an example of a hydraulic circuit 400 that may be used with stamping assembly 100, to operate actuators 106 and push devices 112. As shown in FIG. 8, circuit 400 includes hydraulic cylinders 106A of actuators 106, cylinders 112A of push devices 112, reservoir 402 for storing hydraulic oil used to pressurize cylinders 106A and cylinders 112A, and pump 404. Additionally, circuit 400 includes valves 406 and 408, which control flow of hydraulic oil into cylinders 106A and 112A. Valves 406 and 408 are implemented in circuit 400 as solenoid valves, however in other embodiments, valves 406 and 408 may be implemented using any suitable valve for controlling pressurization of cylinders 106A and 112A, including but not limited to, spool valves. It should be noted that although circuit 400 is shown as including only one valve 408, in practice each of cylinders 112A is fluidly connected to a valve 408 which controls pressurization of the cylinder. Thus while only one valve 408 is shown, for purposes of simplicity reference may be made to "valves" 408.

As shown in FIG. 8, circuit 400 is configured in one embodiment so that cylinders 112A are grouped in sets. As illustrated in one embodiment in FIG. 8, cylinders 112A are grouped into eight sets (1-8). The grouping is accomplished by wiring the solenoid valves 408 of the cylinders in a given group together, so that the sets of cylinders are all pressurized or depressurized as a set, at the same time. Those skilled in the art will appreciate that alternative groupings, or individual actuation of the cylinders is also possible. Operation of circuit 400 is described below in conjunction with FIG. 9.

Figure 9:
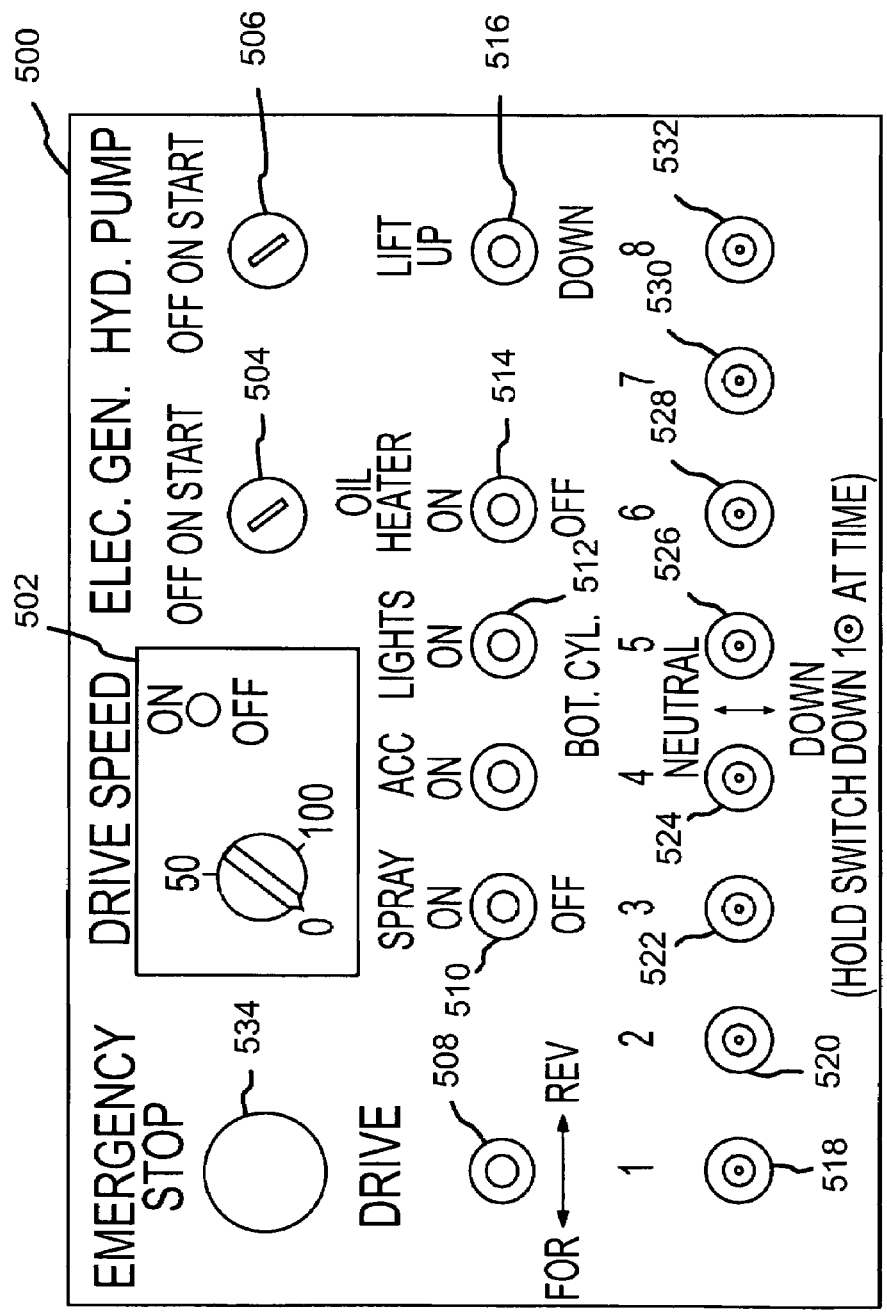
FIG. 9 illustrates a control panel that may be used with the hydraulic circuit illustrated in FIG. 8 and the apparatus illustrated in FIGS. 2 and 3.

FIG. 9 illustrates an example control panel 500 that is used to manually control operation of stamping assembly 100 and hydraulic circuit 400. Control panel 500 includes a number of controls for operating and controlling the operation of a number of parts and devices of assembly 100 and circuit 400. The controls may be implemented in any suitable way including, but not limited to, buttons, switches, levers and dials.

Panel 500 includes controls 502 for controlling the operation of a drive that moves apparatus 100 along tracks 132. Controls 502 include a control for turning the drive on and off; and a dial for indicating the speed at which apparatus 100 moves along tracks 132. In addition, control 508 is used to control the direction in which apparatus 100 is moved. Panel 500 also includes a control 504 for controlling operation of the electric generator 127 for supplying electrical power to panel 500 and other parts of the assembly 100. Control 506 is used to operate the hydraulic power unit 128 and pump 406 to circulate hydraulic oil through circuit 400.

Panel 500 also includes controls for operating and controlling sprayer 126 (control 510), lights that may be included on assembly 100 (control 512) and an oil heater (control 514) that may be within reservoir 402 to heat the hydraulic oil circulated through circuit 400. Additionally, control 516 is used to operate valve 406 and control the pressurizing of cylinders 106A to move the lift frame 104 vertically. Finally, control panel 500 includes controls 518, 520, 522, 524, 526, 528, 530, and 532 for operating and controlling valves 408, and consequently cylinders 112A of push devices 112. In one embodiment, controls 518, 520, 522, 524, 526, 528, 530, and 532 are implemented as center off spring loaded switches. As described above, solenoid valves 408 are wired together in one embodiment to create sets (1-8) of cylinders 112A that are pressurized and depressurized as a unit. Finally, panel 500 includes an emergency stop control 534.

The following is a description of manual operation of stamping assembly 100 and hydraulic circuit 400, using control panel 500, in applying a texture to a concrete panel. First, controls 504 and 506 are manually operated to start, generator 127, power unit 128 and hydraulic pump 404. An operator may also at this point manually operate control 512 to turn lights on, and control 514 to turn the hydraulic oil heater on. Controls 502 are then operated to turn on the drive for moving assembly 100 along tracks 132 and set a drive speed.

When apparatus 100 is ready to be moved over a concrete panel to apply a texture, an operator will turn on sprayer 126 using control 510, and move assembly 100 over the concrete panel by manually operating control 508. When assembly 100 has been positioned so that flexible face 114 and liner 124 are positioned above the concrete panel, the operator will stop movement of assembly 100 and turn off sprayer 126 with control 510. Assembly 100 is now in position to apply the texture on the concrete panel.

At this point, the lift frame 104 is in a raised position, as shown in FIG. 2, which means cylinders 106A are pressurized with hydraulic oil. Additionally, set 1 of hydraulic cylinders 112A are also pressurized to flex face 114 into the curved shape shown in FIGS. 2 and 3. An operator will then lower lift frame 104 by manually operating control 516. Operation of control 516 opens valve 406 of hydraulic circuit 400, pressurizing the top of cylinders 106A, lowering lift frame 104.

When lift frame 104 is lowered, a first portion of liner 124 will contact the concrete panel at the center of flexible face 114, and the entire weight of the assembly 100 will be on set 1 of hydraulic cylinders 112A. After a period of time to allow the liner 124 to press against the concrete panel, control 518 is then operated to depressurize set 1. Control 518 opens the valves 408 that are connected to the cylinders of set 1, which allows the hydraulic oil to exit the cylinders, depressurizing them. An operator then pressurizes set 2 by operating control 520, which closes the valves 408 that are connected to the cylinders of set 2. The lift frame 104 travels down, and weight of assembly 100 then bears on set 2. This process further tends to flatten out liner 124 on the concrete panel.

After a period of time, an operator depressurizes the cylinders of set 2 using control 520, which opens valves 408 connected to the cylinders of set 2. An operator then uses control 522 to close valves 408 connected to the cylinders of set 3 to pressurize the cylinders. The lift frame 104 again travels down and set 3 now bear the weight of assembly 100. The process of depressurizing and pressurizing of the sets of cylinders is continued until all of the sets (1-8) have been cycled through using controls 518, 520, 522, 524, 526, 528, 530, and 532. When the liner 124 has been laid down flat on the panel, an operator may then optionally use controls 518, 520, 522, 524, 526, 528, 530, and 532 to pressurize any of the sets 1-8 of cylinders to selectively apply additional force to press liner 124 against the concrete panel to ensure a good imprint of the texture on the panel.

After the panel has been imprinted with the texture, an operator may (in one embodiment) activate control 518 to pressurize set 1 of the cylinders to give flexible face 114 its original curved shape. The pressurizing of set 1 will tend to peel liner 124 off of the concrete panel at the edges of flexible face 114, which are distal in relation to the center of flexible face 114. An operator simultaneously activates control 516 to close valve 406, which pressurizes cylinders 106A and incrementally lifts the lift frame 104 vertically. In other embodiments, pressurizing set 1 is not performed, and only cylinders 106A are pressurized to incrementally raise lift frame 104. The entire process may then be repeated for applying the texture to additional panels.

One example of a cycle time for applying texture to a concrete panel breaks down as follows: 10 seconds to lower lift frame 104 onto a concrete panel; 5 seconds to pressurize/depressurize each of sets 1-8 of cylinders 112A (total of 40 seconds); another 40 seconds to repressurize each of the sets 1-8 of cylinders 112A to apply additional force and press liner 124 on the panel; 15 seconds to raise lift frame 114; and 30 seconds of travel time to move assembly 100 over a second panel. In this example cycle, the total cycle time is approximately 135 seconds or 2.25 minutes. As those with ordinary skill in the art will appreciate, other cycle sequences and durations are possible, depending on a number of factors including the complexity of the texture design and the viscosity and composition of the concrete used to make the panel.

Figure 10:
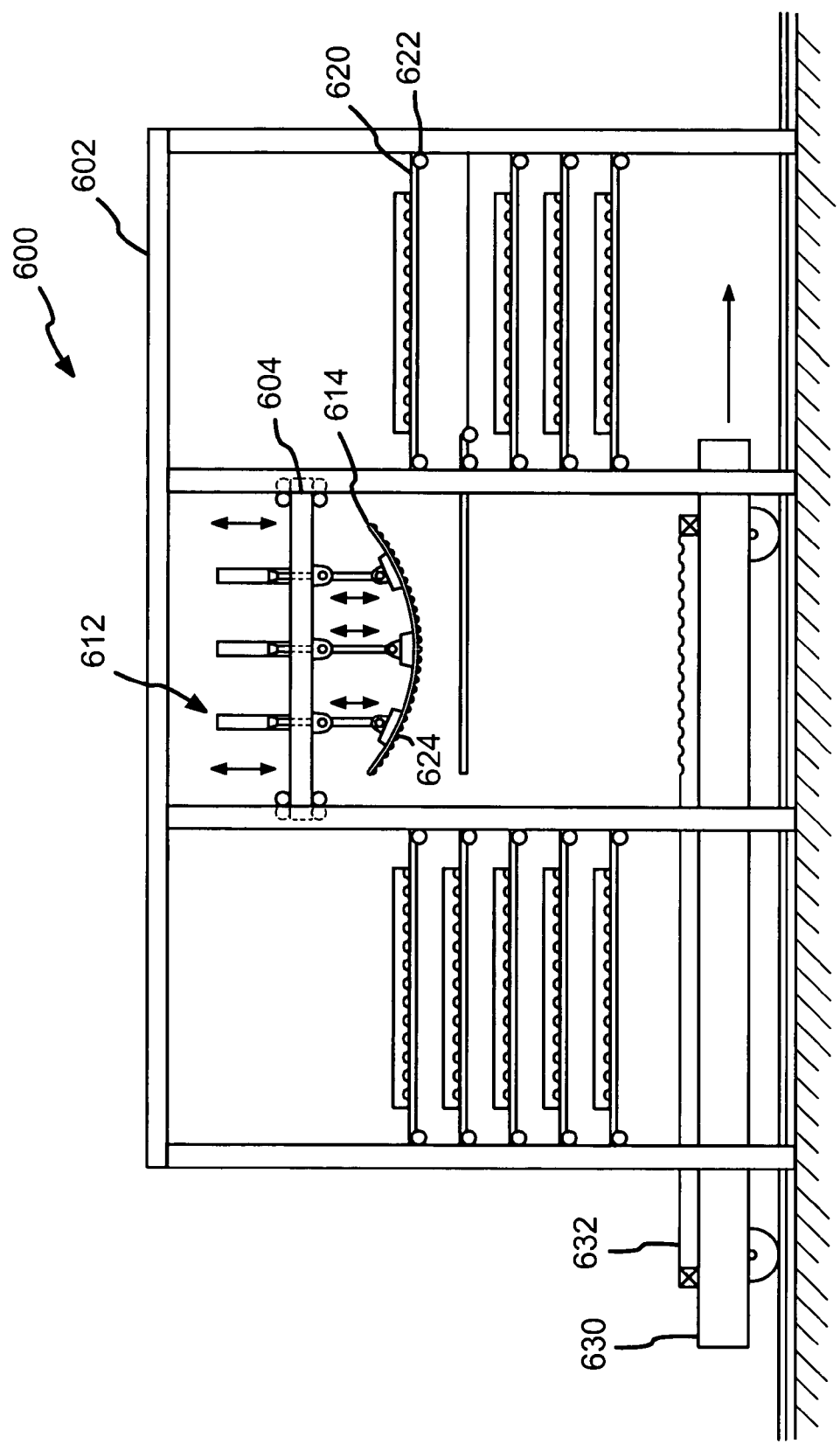
FIG. 10 is a side elevation view of an automated system for applying texture to pliable panels.

FIG. 10 illustrates an apparatus 600 that may be automated for applying textures to concrete panels, according to an embodiment of the present invention. Apparatus 600 includes similar parts to assembly 100, namely a mainframe 602, a lift frame 604, push devices 612 and flexible face 614. The lift frame 604 operates similar to lift frame 104, described above.

In some embodiments, push devices 612 may operate similar to push devices 112, and include hydraulic cylinders 112A and piston rods 112B. However, apparatus 600 is particularly suited for using push devices that are implemented as spring based shock absorbers. In this embodiment, push devices 612 may include coil springs of varying tensions, and central rods with varying travel lengths to give flexible face 614 a desired uneven shape, e.g., curved shape. To lay the flexible face 624 flat on a pliable surface, lift frame 604 may be continually lowered causing the coil springs of push devices 612 compress until flexible face 624 is laid flat on the pliable surface. The following is merely one implementation of using spring based shock absorbers as push devices 612, and other implementations will be readily apparent to those with ordinary skill in the art.

Additionally, apparatus 600 includes a number of slidable shelves 620 that hold a number of flexible faces with attached liners that have different texture designs. In other embodiments, the shelves may hold different liners that are attached to a single flexible face connected to push devices 612. Shelves 620 slide horizontally, actuated by actuators 622, which may be implemented as hydraulic cylinders, or rotary devices etc. Accordingly, when a texture will be applied to a concrete panel, a slidable shelf storing an appropriate flexible face and liner is actuated to slide out underneath lift frame 604. The lift frame 604 is then lowered to allow the push devices 612 to connect to the flexible face and attached liner. After the push devices 612 have been connected to the flexible face, the lift frame 604 is lifted, and the slidable shelf is returned to its original position. The lift frame 604 may then be lowered to apply the texture to a concrete panel.

In the embodiment shown in FIG. 10, apparatus 600 is stationary, and concrete tables with panels are rolled underneath lift frame 604. As shown in FIG. 10, concrete table 630 has a concrete panel 632 that is being textured by apparatus 600. Concrete panel 632 will be imprinted with a number of different textures. Accordingly, the process of texturing panel 630 is as follows, a first flexible face with a liner is connected to push devices 612, by sliding a first slidable shelf under lift frame 604. The lift frame 604 is then lowered to allow the push devices 612 to connect to the first flexible face on the first shelf. After the push devices 612 have been connected to the first flexible face, the lift frame 604 is lifted, and the first slidable shelf is moved to its original position. The lift frame 604 is then lowered and the push devices 612 are selectively actuated (as discussed above with respect to FIG. 2) to apply texture to a portion of concrete panel 632.

After application of the first texture to a section of the panel 632, lift frame 604 is raised, and the first slidable shelf is moved underneath lift frame 604. The first flexible face is disconnected from push devices 612 to be stored on the first slidable shelf. Concrete table 630 is then moved to expose an untextured portion of panel 632, and the process of attaching another flexible face to push devices 612 is repeated. The process continues, until all the desired textures have been applied to panel 632.

As described above, apparatus 600 may be used to apply a number of different textures on a single panel. However, in other applications, apparatus 600 may be used to apply a single texture design to a single panel. For example, apparatus 600 may apply a first texture design to a first set of panels, and then change the flexible face and liner, as described above to apply a second texture design to a second set of panels.

Although the apparatus 600 is shown as stationary in FIG. 10, in other embodiments it may include a drive and guide rollers that allow apparatus 600 to be moved along tracks. In some implementations of this embodiment, the concrete tables with the concrete panels will be stationary with apparatus 600 movable to position liner 624 over a concrete panel. In other implementations, both apparatus 600 and the concrete tables may be movable.

As those with ordinary skill in the art will appreciate, apparatus 600 may be automated using a computer system. The computer system will include at least a central processing unit, memory, and input/output devices. The computer system may be programmed to control apparatus 600 to apply different texture designs to a single panel, or applying a single texture design to a number of panels. When automating apparatus 600, a computer system is programmed to operate the lift frame 604, push devices 612 and slidable shelves 630 automatically, without the need for having a human operator monitor their operation. Implementing the automation of apparatus 600 is well within the ability of one having ordinary skill in the art.

Figure 11:
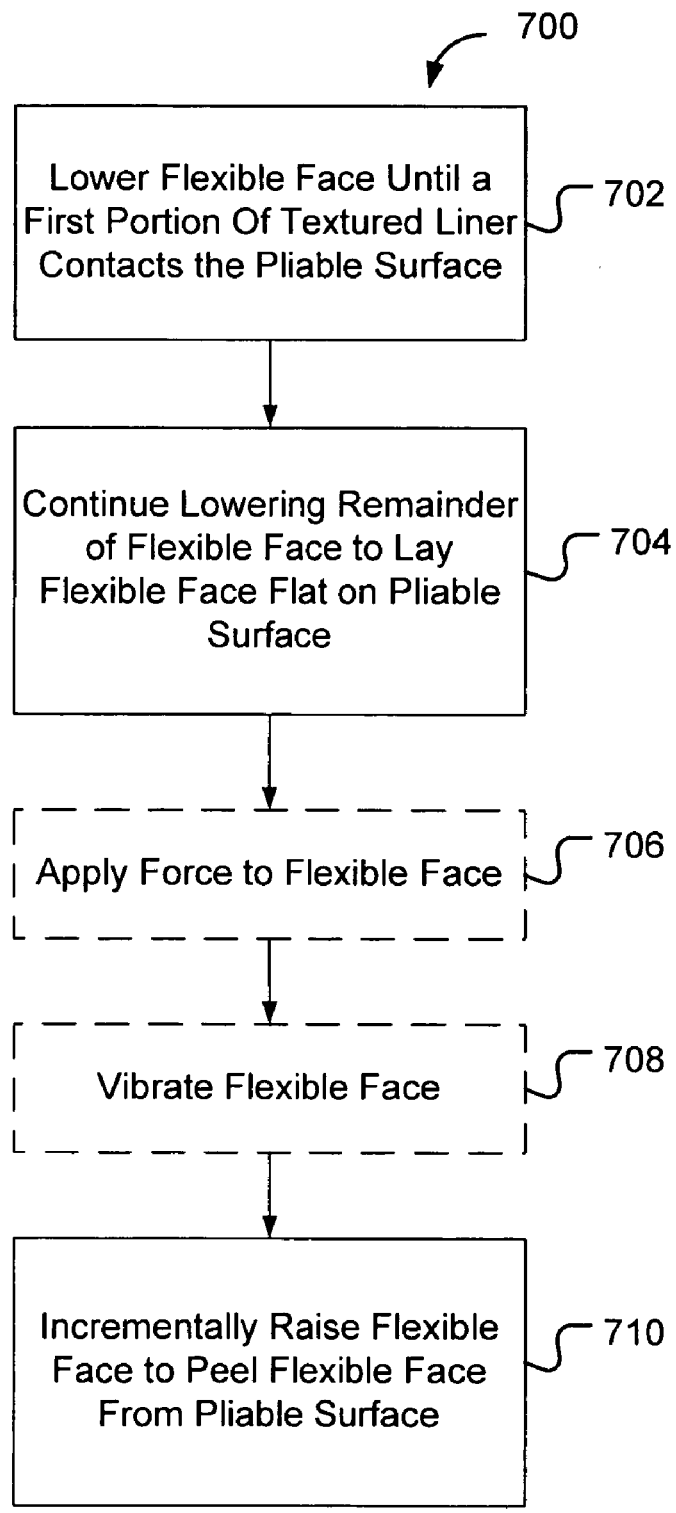
FIG. 11 illustrates a flow chart of a process for applying a texture design to a pliable surface according to an embodiment of the present invention.

FIG. 11 illustrates a flow chart 700 of a method for applying a texture to a pliable surface, using a flexible face with an uneven shape and with a textured liner (e.g. liner 124) attached to a bottom surface of the flexible face. By uneven, it is meant not substantially parallel to a pliable surface located underneath the flexible face. Some examples of uneven shapes for the flexible face include the curved flexible face shown in FIG. 2 and the sloped flexible face shown in FIG. 3. The method may be implemented using any of the previously described embodiments of assembly 100, assembly 400, apparatus 600, or variations thereof.

At step 702, the flexible face is lowered to engage or contact a first portion of the textured liner with the pliable surface. The portion of the textured liner that first contacts the pliable surface will be determined by the shape of the flexible face. As previously described, if the flexible face has a curved shape, then a middle portion of the textured liner will contact the pliable surface first.

At step 704, the remaining portion of flexible face is continually lowered until it lays flat on the pliable surface, and the entire textured liner is engages or contacts the pliable surface. Once the flexible face has been laid flat by step 704, the entire texture design has been applied, i.e. imprinted, on the pliable surface, although some optional steps 706 and 708 may be performed to ensure a higher quality imprint.

Step 706, is an optional step of selectively applying force to the top surface of the flexible face to press the textured liner into the pliable surface. This step may be performed to ensure that an imprint of the texture on the textured liner is clearly made on the pliable surface. As stated above, this step may be omitted, in some embodiments, if by merely laying the flexible face flat, at step 704, adequately imprints the texture design on the pliable surface.

Step 708 is an optional step for vibrating the flexible face. The vibration of the flexible face also improves the quality of the texture imprint made on the pliable surface. The vibrating of the flexible face may reduce the viscosity of the pliable material, thereby allowing the material to better fill-in around the features of the textured liner.

At step 710, the flexible face is incrementally raised to peel the flexible face from the pliable surface. Step 710 may in some embodiments include initially raising one portion of the flexible face that is distal to the first portion contacted at step 702, followed by continuing to raise the flexible so that the first portion is the final portion peeled from the pliable surface. The raising step 710 completes the process of removing the flexible face from the pliable surface. After step 710, the steps of flow chart 700 may be repeated to apply textures to additional pliable surfaces.

As described above, the present invention in various aspects provides a number of advantages over prior art rigid stamps. For example, aspects of the present invention may be implemented using relatively simple hydraulic systems as described above with respect to FIGS. 8 and 9. The simplicity of the hydraulic system allows an operator to apply textures to a variety of different pliable materials with little or no training. Furthermore, with aspects of the present invention, there is no need to calibrate rocking flow rates, or pressure relief rates as is necessary with prior art processes and devices. With the elimination of these additional steps, the present invention provides for consistently creating high quality imprints of texture designs on pliable surfaces.

Additionally, the ability to removably connect various parts, such as the flexible faces and the liners, provides additional benefits, such as ease of transport. Other advantages of the present invention over the prior art will be readily apparent to those of ordinary skill in the art.

While a plurality of embodiments for implementing the invention have been described, it will be appreciated that any number of additional variations or alterations in the elements used to implement the invention may be made and are within the scope of the invention as claimed hereinafter.

What is claimed is:

1. An apparatus for applying a texture to a pliable surface, the apparatus comprising:
   a mainframe;
   a lift frame movably connected to the mainframe, wherein the lift frame is operable to move vertically in relation to the main frame;
   a flexible face comprising a top surface and a bottom surface, wherein the bottom surface includes a texture design; and
   a plurality of push devices connecting the lift frame and the flexible face, wherein the push devices are operable to selectively apply force to the top surface of the flexible face, and wherein the lift frame and the push devices are operable to lay the flexible face flat on the pliable surface so that the entire texture design is in contact with the pliable surface, the push devices being further operable to selectively apply force to the top surface of the flexible face after the entire texture design is in contact with the pliable surface.

2. The apparatus of claim 1, further comprising an actuator for moving the lift frame vertically with respect to the main frame, the actuator comprising one of a hydraulic cylinder, pneumatic cylinder, screw actuator, and rotary actuator.

3. The apparatus of claim 1, wherein the push devices are operable to apply an uneven shape to the flexible face.

4. The apparatus of claim 3, wherein the push devices comprise one of hydraulic cylinders, pneumatic cylinders and spring based shock absorbers.

5. The apparatus of claim 4, wherein the push devices are removably connected to the flexible face.

6. The apparatus of claim 1, further comprising a liner attached to the bottom surface of the flexible face and comprising the texture design.

7. The apparatus of claim 6, wherein the liner comprises a plurality of hoops and the flexible face comprises a plurality of holes, wherein each of the hoops is positionable through one of the holes so that a portion of the hoop is positioned above the top surface of the flexible face to allow a wedge member located above the top surface of the flexible face to be positioned into and out of the portion of the hoop.

8. The apparatus of claim 1, further comprising a vibration device for vibrating the flexible face.

9. The apparatus of claim 1, wherein the apparatus is movable to position the flexible face above the pliable surface for imprinting the texture design on the pliable surface.

10. An apparatus for applying a texture to a pliable surface, the apparatus comprising:
    a mainframe;
    a lift frame movably connected to the mainframe with a plurality of actuators, wherein the actuators are operable to move the lift frame vertically;
    a flexible face with a top surface and a bottom surface;
    a plurality of push devices connecting the lift frame to the flexible face, wherein the plurality of push devices are operable to apply an uneven shape to the flexible face; and
    a liner attached to the bottom surface of the flexible face and comprising a texture design for application to the pliable surface, wherein the plurality of push devices and the lift frame are operable to lay the flexible face flat on the pliable surface so that the entire texture design is in contact with the pliable surface, the push devices being further operable to selectively apply force to the top surface of the flexible face after the entire texture design is in contact with the pliable surface.

11. The apparatus of claim 10, wherein the flexible face comprises clamps on the top surface for removably attaching the plurality of push devices to the flexible face.

12. The apparatus of claim 11, further comprising a plurality of shelves for storing a plurality of flexible faces, each flexible face having a liner on the bottom surface with a texture design and clamps on a top surface for attachment to the plurality of push devices, and wherein the plurality of shelves are slidable from a first position to a second position, the second position located underneath the lift frame.

13. The apparatus of claim 12, wherein the lift frame is operable to be lowered to attach the plurality of push devices to one of the plurality of flexible faces once a corresponding shelf containing the flexible face has been moved to the second position.

14. The apparatus of claim 13, wherein upon attachment of the push devices to the flexible face and retraction of the self, the lift frame and the plurality of push devices are further operable to selectively apply forces to the flexible face to apply the texture design to a pliable surface positioned underneath the lift frame.

15. The apparatus of claim 13, wherein the apparatus is stationary and is operable to apply a texture design to a pliable surface that is movable to a position below the flexible face.

16. The apparatus of claim 1, wherein the force applied to the top surface of the face is a vibratory force.

17. The apparatus of claim 13, wherein the force applied to the top surface of the face is a vibratory force.

* * * * *